United States Patent
Ikeda et al.

(10) Patent No.: US 6,803,131 B2
(45) Date of Patent: Oct. 12, 2004

(54) MAGNETIC RECORDING MEDIUM

(75) Inventors: Naoki Ikeda, Miyagi (JP); Seiichi Onodera, Miyagi (JP)

(73) Assignee: Sony Corporation, Tokyo (JP)

( * ) Notice: Subject to any disclaimer, the term of this patent is extended or adjusted under 35 U.S.C. 154(b) by 123 days.

(21) Appl. No.: 10/236,772

(22) Filed: Sep. 6, 2002

(65) Prior Publication Data

US 2003/0068529 A1 Apr. 10, 2003

(30) Foreign Application Priority Data

Sep. 13, 2001 (JP) ........................................ 2001-278192

(51) Int. Cl.$^7$ ............................. G11B 5/66; G11B 5/70
(52) U.S. Cl. ........................ 428/694 TR; 428/694 SG; 428/336; 428/900
(58) Field of Search .................... 428/694 TS, 694 SG, 428/694 T, 900, 336, 694 TR

(56) References Cited

U.S. PATENT DOCUMENTS

| | | | | |
|---|---|---|---|---|
| 4,762,742 A | * | 8/1988 | Sonoda et al. | 428/141 |
| 4,770,924 A | * | 9/1988 | Takai et al. | 428/212 |
| 5,820,969 A | * | 10/1998 | Satoh | 428/141 |
| 6,217,970 B1 | * | 4/2001 | Arita et al. | 428/65.3 |
| 6,372,367 B1 | * | 4/2002 | Matsuda et al. | 428/694 TS |

* cited by examiner

Primary Examiner—Holly Rickman
(74) Attorney, Agent, or Firm—Robert J. Depke; Holland & Knight LLP

(57) ABSTRACT

Fine projections on a magnetic layer surface are controlled so as to reduce a media noise and improve $C/N_{media}$ characteristic. A magnetic recording medium allows reproduction through a MR head or a GMR head. The magnetic layer on a main surface of a non-magnetic base has a coercive force of 80 KA/m or more and 180 KA/m or less. Assuming that a height of the fine projections is h and a diameter of the fine projections at a half-height h/2 is $\phi_{h/2}$, 99% of the fine projections having a height not less than 10 nm satisfy a relationship as expressed by 100 nm $\geq \phi_{h/2} \geq$ 40 nm.

5 Claims, 5 Drawing Sheets

| SAMPLE THICKER FILM THICKNESS 77nm | FILLER DIAMETER | CONTENT(%) OF 100nm $\geq \Phi \geq$ 40nm | 99.3 |
|---|---|---|---|
| | FILLER DENSITY ($\times 10^4$/mm$^2$) | h > 25nm | 3.1 |
| | | 25nm $\geq$ h > 20nm | 28.9 |
| | | 20nm $\geq$ h > 15nm | 84.3 |
| | | 15nm $\geq$ h > 10nm | 636 |
| | | 10nm $\geq$ h > 5nm | 2060 |

FIG. 1

| | BASE | | SAMPLE | | | | | | | | | |
|---|---|---|---|---|---|---|---|---|---|---|---|---|
| | | | FILM THICKNESS | PROJECTION DIAMETER | PROJECTION DENSITY | Ra | Ry | Rz | C/N_modu | SHUTTLING DURABILITY | CORROSION RESISTANCE | ABRASION (nm, 100h) |
| EXAMPLE 1 | ACCEPTABLE PROJECTION DIAMETER | ACCEPTABLE DENSITY | 50 | OK | OK | 1.4 | 23 | 18 | 0.0 | 50 PASSES, ACCEPTABLE | | 170 |
| EXAMPLE 2 | ↑ | ↑ | 33 | OK | OK | 1.1 | 23 | 18 | 1.3 | 50 PASSES, ACCEPTABLE | | 144 |
| EXAMPLE 3 | ↑ | ↑ | 75 | OK | OK | 2.2 | 40 | 33 | -1.6 | 50 PASSES, ACCEPTABLE | | 238 |
| COMPARATIVE EXAMPLE 1 | ↑ | ↑ | 28 | SMALL DIAMETER | OK | 0.9 | 20 | 16 | 1.5 | 42 PASSES | NG | LESS THAN 100h |
| COMPARATIVE EXAMPLE 2 | ↑ | ↑ | 82 | LARGE DIAMETER | MANY HIGH PROJECTIONS | 2.2 | 41 | 38 | -2.1 | 50 PASSES, ACCEPTABLE | | 326 |
| COMPARATIVE EXAMPLE 3 | ↑ | LOW DENSITY & FEW FILLERS | 32 | OK | LOW DENSITY | 0.8 | 17 | 13 | 2.0 | 26 PASSES | | LESS THAN 100h |
| COMPARATIVE EXAMPLE 4 | ↑ | ↑ | 77 | OK | LOW DENSITY | 2.2 | 36 | 37 | -1.2 | 30 PASSES | | LESS THAN 100h |
| COMPARATIVE EXAMPLE 5 | ↑ | HIGH DENSITY & MANY FILLERS | 34 | OK | HIGH DENSITY | 2.3 | 31 | 26 | 0.3 | 50 PASSES, ACCEPTABLE | NG | 271 |
| COMPARATIVE EXAMPLE 6 | ↑ | ↑ | 79 | LARGE DIAMETER | HIGH DENSITY | 2.6 | 48 | 44 | -2.9 | 50 PASSES, ACCEPTABLE | | 429 |
| COMPARATIVE EXAMPLE 7 | LARGE PROJECTION DIAMETER, NOT ACCEPTABLE | MANY HIGH PROJECTIONS | 49 | LARGE DIAMETER | MANY HIGH PROJECTIONS | 3.2 | 54 | 58 | -3.6 | 50 PASSES, ACCEPTABLE | | 532 |

FIG. 2

| BASE | FILLER DIAMETER | CONTENT(%) OF 50nm ≥ Φ ≥ 10nm | 100 |
|---|---|---|---|
| | FILLER DENSITY (×10⁴/mm²) | h > 20nm | 4.2 |
| | | 20nm ≥ h > 15nm | 18.2 |
| | | 15nm ≥ h > 10nm | 669 |
| | | 10nm ≥ h > 5nm | 2231 |

FIG. 3

| SAMPLE FILM THICKNESS 50nm | FILLER DIAMETER | CONTENT(%) OF 100nm ≥ Φ ≥ 40nm | 100 |
|---|---|---|---|
| | FILLER DENSITY (×10⁴/mm²) | h > 25nm | 13.8 |
| | | 25nm ≥ h > 20nm | 73.1 |
| | | 20nm ≥ h > 15nm | 289 |
| | | 15nm ≥ h > 10nm | 1324 |
| | | 10nm ≥ h > 5nm | 2690 |

FIG. 4

| SAMPLE FILM THICKNESS 33nm | FILLER DIAMETER | CONTENT(%) OF 100nm ≥ Φ ≥ 40nm | 100 |
|---|---|---|---|
| | FILLER DENSITY (×10⁴/mm²) | h > 25nm | 8.1 |
| | | 25nm ≥ h > 20nm | 48.2 |
| | | 20nm ≥ h > 15nm | 140 |
| | | 15nm ≥ h > 10nm | 912 |
| | | 10nm ≥ h > 5nm | 1848 |

FIG. 5

| SAMPLE FILM THICKNESS 75nm | FILLER DIAMETER | CONTENT(%) OF 100nm ≥ Φ ≥ 40nm | 99.8 |
|---|---|---|---|
| | FILLER DENSITY (×10⁴/mm²) | h > 25nm | 19.9 |
| | | 25nm ≥ h > 20nm | 104.3 |
| | | 20nm ≥ h > 15nm | 328 |
| | | 15nm ≥ h > 10nm | 1437 |
| | | 10nm ≥ h > 5nm | 3382 |

FIG. 6

| SAMPLE TOO THIN FILM THICKNESS 28nm | FILLER DIAMETER | CONTENT(%) OF $100nm \geq \Phi \geq 40nm$ | 96.5 |
|---|---|---|---|
| | FILLER DENSITY ($\times 10^4/mm^2$) | $h > 25nm$ | 6.9 |
| | | $25nm \geq h > 20nm$ | 41.8 |
| | | $20nm \geq h > 15nm$ | 118 |
| | | $15nm \geq h > 10nm$ | 846 |
| | | $10nm \geq h > 5nm$ | 1663 |

FIG. 7

| SAMPLE TOO THICK FILM THICKNESS 82nm | FILLER DIAMETER | CONTENT(%) OF $100nm \geq \Phi \geq 40nm$ | 97.8 |
|---|---|---|---|
| | FILLER DENSITY ($\times 10^4/mm^2$) | $h > 25nm$ | 21.4 |
| | | $25nm \geq h > 20nm$ | 147 |
| | | $20nm \geq h > 15nm$ | 365 |
| | | $15nm \geq h > 10nm$ | 1817 |
| | | $10nm \geq h > 5nm$ | 4007 |

FIG. 8

| BASE LOW FILLER DENSITY | FILLER DIAMETER | CONTENT(%) OF $50nm \geq \Phi \geq 10nm$ | 99.6 |
|---|---|---|---|
| | FILLER DENSITY ($\times 10^4/mm^2$) | $h > 20nm$ | 2.4 |
| | | $20nm \geq h > 15nm$ | 7.6 |
| | | $15nm \geq h > 10nm$ | 336 |
| | | $10nm \geq h > 5nm$ | 1185 |

FIG. 9

| SAMPLE THINNER FILM THICKNESS 32nm | FILLER DIAMETER | CONTENT(%) OF $100nm \geq \Phi \geq 40nm$ | 99.8 |
|---|---|---|---|
| | FILLER DENSITY ($\times 10^4/mm^2$) | $h > 25nm$ | 1.2 |
| | | $25nm \geq h > 20nm$ | 14.6 |
| | | $20nm \geq h > 15nm$ | 66.9 |
| | | $15nm \geq h > 10nm$ | 574 |
| | | $10nm \geq h > 5nm$ | 1456 |

FIG. 10

| SAMPLE THICKER FILM THICKNESS 77nm | FILLER DIAMETER | CONTENT(%) OF 100nm ≧ Φ ≧ 40nm | 99.3 |
|---|---|---|---|
| | FILLER DENSITY (×10$^4$/mm$^2$) | h > 25nm | 3.1 |
| | | 25nm ≧ h > 20nm | 28.9 |
| | | 20nm ≧ h > 15nm | 84.3 |
| | | 15nm ≧ h > 10nm | 636 |
| | | 10nm ≧ h > 5nm | 2060 |

FIG. 11

| BASE HIGH FILLER DENSITY | FILLER DIAMETER | CONTENT(%) OF 50nm ≧ Φ ≧ 10nm | 100 |
|---|---|---|---|
| | FILLER DENSITY (×10$^4$/mm$^2$) | h > 20nm | 12.7 |
| | | 20nm ≧ h > 15nm | 42.6 |
| | | 15nm ≧ h > 10nm | 1368 |
| | | 10nm ≧ h > 5nm | 2510 |

FIG. 12

| SAMPLE THINNER FILM THICKNESS 34nm | FILLER DIAMETER | CONTENT(%) OF 100nm ≧ Φ ≧ 40nm | 99.7 |
|---|---|---|---|
| | FILLER DENSITY (×10$^4$/mm$^2$) | h > 25nm | 20.3 |
| | | 25nm ≧ h > 20nm | 168 |
| | | 20nm ≧ h > 15nm | 490 |
| | | 15nm ≧ h > 10nm | 1947 |
| | | 10nm ≧ h > 5nm | 3609 |

FIG. 13

| SAMPLE THICKER FILM THICKNESS 79nm | FILLER DIAMETER | CONTENT(%) OF 100nm ≧ Φ ≧ 40nm | 97.5 |
|---|---|---|---|
| | FILLER DENSITY (×10$^4$/mm$^2$) | h > 25nm | 22.9 |
| | | 25nm ≧ h > 20nm | 197 |
| | | 20nm ≧ h > 15nm | 571 |
| | | 15nm ≧ h > 10nm | 2385 |
| | | 10nm ≧ h > 5nm | 4004 |

FIG. 14

| BASE FILLER OF LARGE PARTICLE SIZE | FILLER DIAMETER | CONTENT(%) OF 50nm ≥ Φ ≥ 10nm | 58.2 |
|---|---|---|---|
| | FILLER DENSITY (×10⁴/mm²) | h > 20nm | 15.6 |
| | | 20nm ≥ h > 15nm | 38.2 |
| | | 15nm ≥ h > 10nm | 1198 |
| | | 10nm ≥ h > 5nm | 1564 |

FIG. 15

| SAMPLE THINNER FILM THICKNESS 34 nm | FILLER DIAMETER | CONTENT(%) OF 100nm ≥ Φ ≥ 40nm | 38.6 |
|---|---|---|---|
| | FILLER DENSITY (×10⁴/mm²) | h > 25nm | 26 |
| | | 25nm ≥ h > 20nm | 221 |
| | | 20nm ≥ h > 15nm | 692 |
| | | 15nm ≥ h > 10nm | 2732 |
| | | 10nm ≥ h > 5nm | 3022 |

MAGNETIC RECORDING MEDIUM

CROSS REFERENCES TO RELATED APPLICATIONS

The present document is based on Japanese Priority Document JP 2001-278192, filed in the Japanese Patent Office on Sep. 13, 2001, the entire contents of which being incorporated herein by reference.

BACKGROUND OF THE INVENTION

1. Field of the Invention

The present invention particularly relates to a high density magnetic recording medium which is applicable to an MR (magneto-resistive) head and a GMR (giant magneto-resistive) head.

2. Description of Related Art

Conventionally, as a magnetic recording medium, a so-called coating type magnetic recording medium is well-known, which is manufactured in such a way that a magnetic coating where a magnetic oxide powder or a magnetic alloy powder is dispersed in an organic binder such as polyvinylchrolide polyvinylacetate co-polymer, polyester resin, polyurethane resin is coated on a non-magnetic base and then dried.

While, according to a need for higher density recording, a magnetic recording medium having a magnetic layer comprising a ferromagnetic thin film where a ferromagnetic material comprising a metal or an alloy such as Co—Ni is directly coated on a non-magnetic base by means of plating or a vacuum thin-film forming process (such as a vacuum deposition process, a sputtering process, an ion plating process, and the like) is used in practice.

Such a magnetic recording medium of a so-called magnetic thin metal film type has several advantages in coercive force, remanent magnetization, squareness ratio, and not only has an excellent electromagnetic transformation performance at a shorter wavelength but also may be formed to have a very thin magnetic layer so that a demagnetization in records and a caliper loss during reproduction may be reduced. Further, since it is not necessary to mix a binder of a non-magnetic material into the magnetic layer, the medium may have a high filling up ratio of a magnetic material so as to obtain a higher magnetization, for example.

Further, in an effort to obtain a larger output by improving an electromagnetic transformation performance in such a kind of magnetic recording medium, a so-called oblique evaporation a magnetic layer is obliquely or tiltedly formed by means a vapor deposition process has been proposed and used in practice in a magnetic tape for a high quality VTR, a digital VTR, a data storage, and the like.

Although the magnetic recording medium of magnetic metal thin-film type has advantages as described above, there is a need for forming fine projections on an outermost surface on the magnetic layer side in order to reduce friction between a recording/reproducing magnetic head and a slide-contact surface of the magnetic recording medium—that is the outermost surface of the magnetic layer side—and to obtain sufficient durability of the magnetic layer.

In particular, according to a need for higher density recording, it is required that the fine projections should have an even and appropriate height in order to reduce a spacing loss and be dispersed in the magnetic layer evenly and in an appropriate density in order to obtain an appropriate electromagnetic transformation performance while maintaining low friction and high durability as well, and the magnetic layer is required to be formed much thinner because of a need for a smaller medium with a larger capacity.

Further, in response to a higher recording density in the magnetic recording medium, it is expected that, as to a magnetic head, a conventional inductive head will be replaced with a more sensitive head such as a magneto-resistive head (MR head) and a giant magneto-resistive head (GMR head).

When a magnetic head of a magneto-resistive effect type such as an MR head and a GMR head is used for a magnetic recording medium of a thin metal film type, the magnetic head provides a higher output than the conventional inductive head and has advantages in that the output does not depend on a relative speed between the medium tape and the head, for example.

However, a conventional metal evaporated tape generates an excessive amount of magnetic flux so that a resistance change in an MR element is out of a linear area. As a result it becomes difficult to obtain a distortion-free characteristic.

Further, a reproducing head has a high sensitivity so that a media noise becomes dominant in a $C/N_{media}$ (C/N: carrier to noise ratio), whereby a conventional surface design on the magnetic layer side causes an excessive amount of noises.

In addition, an abrasion of the MR element causes a problem in that a reproduced waveform becomes asymmetrical, for example.

In consideration of the above, as for a magnetic recording medium applicable to a highly sensitive magnetic head such as an MR head and a GMR head, the present inventors have made an effort to provide a magnetic recording medium capable of reducing a media noise and an abrasion in a reproducing MR head or a reproducing GMR head and of having durability as well by optimizing a thickness of the magnetic layer and a magnetic characteristic and further of controlling the fine projections on the surface of the magnetic layer.

SUMMARY OF THE INVENTION

A magnetic recording medium according to the present invention, comprises a magnetic layer, on a main surface of a non-magnetic base, which is formed by means of a thin-film forming technology by vacuum, and the magnetic recording medium is applicable to a reproducing system using a magneto-resistance effect type (magneto-resistive) head (MR head) or a giant magneto-resistance effect type (giant magneto-resistive) head (GMR head). Fine projections are formed at the outermost surface of the magnetic layer side.

Assuming that a height of the fine projections is h and a diameter of the fine projections at a half-height h/2 is $\phi_{h/2}$, 99% of the fine projections having a height not less than 10 nm satisfy a relationship expressed by 100 nm$\geq\phi_{h/2}\geq$40 nm, and a relationship between the height h of the fine projections and a density P (a number of fine projections per square mm) of the fine projections is as follows:

for h>25 nm, P is 250,000/mm² or less;

for 25 nm$\geq$h>20 nm, P is 300,000/mm² or more and 1,250,000/mm² or less;

for 20 nm$\geq$h>15 nm, P is 1,000,000/mm² or more and 3,750,000/mm² or less;

for 15 nm$\geq$h>10 nm, P is 8,000,000/mm² or more and 25,000,000/mm² or less; and for 10 nm$\geq$h>5 nm, P is 50,000,000/mm² or less.

By controlling the conditions as described above, the present invention provides a magnetic recording medium which reduces noises, obtains a high C/N, reduces abrasion in the reproducing MR head and the reproducing GMR head, and also has good durability.

By controlling fine projections on the surface of the non-magnetic base, a height and a density of fine projections on the magnetic layer, the $C/N_{media}$ may be improved, good shuttling durability and corrosion resistance may be provided, and abrasion resistance of the MR head may be improved.

DESCRIPTION OF THE PREFERRED EMBODIMENTS

A magnetic recording medium according to the present invention, comprises a magnetic layer having a thickness of 30 nm or more and 80 nm or less on a main surface of a non-magnetic base. The magnetic layer is fabricated by means of a thin-film forming technology by vacuum, and the magnetic recording medium is a magnetic tape applicable to a helical scanning recording/reproducing system using a reproducing MR head or a reproducing GMR head; and fine projections are formed at the outermost surface of the magnetic layer side.

Assuming that the height of the fine projections is h and the diameter of the fine projections at the half-height h/2 is $\phi_{h/2}$, 99% of the fine projections having a height not less than 10 nm are controlled to satisfy a relationship as shown in a formula 100 nm$\geq\phi_{h/2}\geq$40 nm, and a relationship between a height h of the fine projections and a density P of the fine projections as follows:

for h>25 nm, P is 250,000/mm$^2$ or less;

for 25 nm$\geq$h>20 nm, P is 300,000/mm$^2$ or more and 1,250,000/mm$^2$ or less;

for 20 nm$\geq$h>15 nm, P is 1,000,000/mm$^2$ or more and 3,750,000/mm$^2$ or less;

for 15 nm$\geq$h>10 nm, P is 8,000,000/mm$^2$ or more and 25,000,000/mm$^2$ or less; and for 10 nm$\geq$h>5 nm, P is 50,000,000/mm$^2$ or less.

An embodiment of the magnetic recording medium according to the present invention will be described with reference to tables in attached figures, however, the present invention is not limited to the embodiment or examples.

The non-magnetic base may be any of a polyethylene terephthalate film, a polyethylene naphthalate film, a polyimide film, a polyamide film, a poly (ether imide) film, etc.

Surface properties of the non-magnetic base affects surface properties of the magnetic layer when the magnetic layer is formed by means of a vacuum thin-film forming process, and also affects a $C/N_{media}$, runnability, and durability of a finished magnetic recording medium, therefore it is necessary to control the surface properties of the non-magnetic base.

In order to obtain a high $C/N_{media}$, a magnetic recording medium with the least possible number of projections may be chosen to even the surface of the magnetic layer. However, if the magnetic layer is too even, friction between the magnetic layer and the head becomes large, and therefore runnability and durability for a magnetic recording medium are degraded. Whereas, if more projections are formed, a higher durability may be obtained, however, it is difficult to realize a high $C/N_{media}$, thereby causing an abrasion of the reproducing head and making a reproduced waveform asymmetrical. Thus, by controlling projections formed on the surface of the non-magnetic base, a height and a density of fine projections formed on the surface of the magnetic layer of the magnetic recording medium were controlled.

Magnetic metal materials for forming the magnetic layer may be any material as far as it is used for a conventional metal evaporated tape. For example, a ferromagnetic metals such as Fe, Co, Ni and a ferromagnetic alloy such as Fe—Co, Co—Ni, Co—Cr, Co—Cr—Ta, Co—Cr—Pt, Co—Ni—Pt, Fe—Co—Ni, Fe—Co—B, Fe—Ni—B, Fe—Co—Ni—Cr may be selected.

The magnetic layer may be formed into a thin-film by means of PVD (physical vapor deposition) technology such as a vapor-deposition process where a magnetic metal material is heated to evaporate and then deposited on the non-magnetic base, an ion plating process where evaporation of a magnetic metal material is carried out while discharging, a sputtering process where glow discharging is caused in an atmosphere mainly containing argon and an argon ion hits and drives an atom on a target surface into the atmosphere.

Here, the magnetic layer may be a single layer film or a multi-layer film which are formed by means of the above process. Further, an underlying layer or an intermediate layer may be disposed between the non-magnetic base and the magnetic layer, or between multiple layers for a magnetic layer having such multiple layers in order to improve adhesion between the multiple layers and to control coercive force. In addition, an oxide may be adopted in the vicinity of the surface of the magnetic layer in order to improve its corrosion resistance, for example.

It is preferred that a protective layer is formed on the magnetic layer of the magnetic recording medium and the protective layer is mainly formed of carbon in order to improve the durability and the corrosion resistance.

The protective layer may be formed by means of a conventional vacuum film-forming technology. For example, a CVD (chemical vapor deposition) process where a carbon compound is decomposed in a plasma atmosphere and deposited on a magnetic layer may steadily form a film of a hard carbon referred to as a diamond-like carbon which has advantages in abrasion resistance, corrosion resistance, and surface coverage, also has an even surface form and a high electric resistance.

As to carbon compounds used for forming the protective layer, any conventional material such as hydrocarbons, ketones, and alcohols may be used. Further, while generating plasma, Ar and $H_2$ may be induced as a gas for promoting decomposition of hydrocarbons. Still further, in order to improve film hardness and corrosion resistance of the diamond-like carbon, the carbon may have been reacted with nitrogen and fluorine, and the diamond-like carbon layer may be a single layer or multiple layers. In addition, while generating plasma, gases such as $N_2$, $CHF_3$, and $CH_2F_2$ in addition to hydrocarbons may be used alone or in a state of an appropriate mixture so as to form a film.

If the protective layer is formed too thick, a spacing loss increases, whereas, if it is too thin, durability and corrosion resistance drop. Thus, the protective layer is preferably formed in a thickness between about 4 nm and about 15 nm.

The magnetic recording medium according to the present invention has a back coat layer of a predetermined material on the other side of the surface where the magnetic layer is formed, and the back coat layer preferably has a thickness between 0.3 $\mu$m and 0.8 $\mu$m. A thickness of less than 0.3 $\mu$m does not effect as a back coat layer. A thickness of more than 0.8 $\mu$m increases the total thickness of the medium. As a result, the medium of a specified length cannot be accommodated within a cassette casing. A predetermined lubricant may be applied to both surface layers so as to obtain sufficient runnability and durability.

The magnetic recording medium having the construction as described above satisfies, assuming that the height of the fine projections on the outermost surface on the surface where the magnetic layer is formed is h and the diameter of the fine projections at a half-height h/2 is $\phi_{h/2}$, in 99% of the fine projections having a height not less than 10 nm, a relationship as shown in a formula 100 nm $\geq \phi_{h/2} \geq$ 40 nm, and the height h of the fine projections and a density P of the fine projections are specified as follows:

for h>25 nm, P is 250,000/mm² or less;

for 25 nm $\geq$ h>20 nm, P is 300,000/mm² or more and 1,250,000/mm² or less;

for 20 nm $\geq$ h>15 nm, P is 1,000,000/mm² or more and 3,750,000/mm² or less;

for 15 nm $\geq$ h>10 nm, P is 8,000,000/mm² or more and 25,000,000/mm² or less; and for 10 nm $\geq$ h>5 nm, P is 50,000,000/mm² or less.

In order to satisfy the above relationships about the outermost surface of the magnetic recording medium, it is effective to define the surface properties of the non-magnetic base itself and to control the film thickness of the magnetic layer at the same time. In other words, when the diameter of surface projections on the non-magnetic base having a thickness of 3.8 μm or more and 5.3 μm or less is reduced, assuming that, for projections on the surface of the non-magnetic base where the magnetic layer is not adhered, their height is h' and a diameter of the projections at a half-height h'/2 is $\phi'_{h'/2}$, 99% of the fine projections having a height greater than 10 nm on the surface of the non-magnetic base satisfy a relationship of 50 nm $\geq \phi'_{h'/2} \geq$ 10 nm.

A relationship between the height h' of the fine projections and the density P' of the fine projections is as follows:

for h'>20 nm, P' is not greater than 100,000/mm²;

for 20 nm $\geq$ h'>15 nm, the density P' is between 100,000 /mm² and 300,000/mm² (inclusive);

for 15 nm $\geq$ h'>10 nm, P' is between 2,000,000/mm² and 15,000,000/mm² inclusive); and for 10 nm $\geq$ h'>5 nm, P' is not greater than 30,000,000/ mm².

According to these conditions, the non-magnetic base is specified and the magnetic layer is formed so as to be not less than 30 nm and not greater than 80 nm in thickness.

Then, the magnetic layer is characterized in that an induced oxygen quantity, an electron beam power, and an adhering angle of an evaporated particle are adjusted so that a coercive force at 20° C. is not less than 80 KA/m and not greater than 180 KA/m and a product Mr·t of remanent magnetization Mr and the film thickness is not less than 10 mA and not more that 30 mA. When the magnetic surface side of the magnetic recording medium is observed by means of an AFM (atomic force microscope), the magnetic layer has a surface where its arithmetic mean roughness Ra is 1.0 nm to 2.3 nm, the maximum roughness depth Ry is 20 nm to 50 nm, and mean roughness depth Rz is 15 nm to 35 nm.

As described above, it is very important to control the film thickness and magnetic characteristics when using a reproducing head of a magneto-resistance effect (magneto-resistive) type. Further, when the magnetic layer is formed thin, the magnetic recording medium does not provide a sufficient output and degrades its corrosion resistance. When the magnetic layer is formed thick, surface projections of the non-magnetic base do not affect the magnetic layer in terms of shape, which may cause an increase in friction and a decrease in durability.

EXAMPLE 1

As a non-magnetic base of the magnetic recording medium, a polyethylene naphthalate film having a thickness of 4.6 μm was prepared.

The non-magnetic base had fine projections h formed on its surface. A content of filler diameters meeting an equation 50 nm $\geq \phi$ 10 nm was 100%; a density of fine projections meeting an equation h>20 nm was 42,000/mm²; a density of fine projections meeting an equation 20 nm $\geq$ h>15 nm was 182,000/mm²; a density of fine projections meeting an equation 15 nm $\geq$ h>10 nm was 6,690,000/mm²; and a density of fine projections meeting an equation 10 nm $\geq$ h>5 nm was 22,310,000/mm², as shown in FIG. 2.

Then, Co was evaporated and deposited on the non-magnetic base so as to form a magnetic layer comprising a magnetic thin metal film having a film thickness of 50 nm. Then, a protective layer of diamond-like carbon was formed on the magnetic layer by means of a plasma CVD process. Subsequently, a back coat layer having a thickness of 0.5 μm and comprising carbon and polyurethane resin was formed on a main surface on the other side of the magnetic layer forming side. Then, the resulting composite film was cut every 6.35 mm in width and a lubricant containing perfluoro polyethers was applied to the magnetic surface side so as to make a sample magnetic tape.

The results of measurements with respect to diameters and densities of the projections of the finished magnetic tape are also listed in FIG. 3, and the results of assessment of the measurements are listed in FIG. 1.

As for observations of the surface shapes, a scanning probe microscope manufactured by SHIMADZU was used to calculate the heights and densities of the fine projections.

EXAMPLE 2

A sample for Example 2 was prepared in such a way that only the film thickness of the thin metal film of Example 1 would be selected to be 33 nm and other conditions would be similar to Example 1. The results of measurements with respect to diameters and densities of the projections of the finished magnetic tapes are listed in FIG. 4, and the results of assessment of the measurements are also listed in FIG. 1.

EXAMPLE 3

A sample for Example 3 was prepared in such a manner that only the film thickness of the thin metal film of Example 1 would be selected to be 75 nm and other conditions would be similar to Example 1. The results of measurements with respect to diameters and densities of the projections of the finished magnetic tapes are listed in FIG. 5, and the results of assessment of the measurements are also listed in FIG. 1.

Comparative Example 1

A sample for Comparative Example 1 was prepared in order that only the film thickness of the thin metal film of Example 1 would be selected to be 28 nm and other conditions would be similar to Example 1. The results of measurements with respect to diameters and densities of the projections of the finished magnetic tapes are listed in FIG. 6, and the results of assessment of the measurements are also listed in FIG. 1.

Comparative Example 2

A sample for Comparative Example 2 was prepared in such a way that only the film thickness of the thin metal film of Example 1 would be selected to be 82 nm and other conditions would be similar to Example 1. The results of measurements with respect to diameters and densities of the projections of the finished magnetic tapes are listed in FIG. 7, and the results of assessment of the measurements are also listed in FIG. 1.

Comparative Example 3

A polyethylene naphthalate film of the non-magnetic base having fine projections h formed on its surface, in which:

a content of fillers having a filler diameter defined by an expression, 50 nm≧φ≧10 nm, is 99.6%;

a density of fine projections defined by an expression h>20 nm is 24,000/mm$^2$;

a density of fine projections defined by an expression 20 nm≧h>15 nm is 76,000/mm$^2$;

a density of fine projections defined by an expression 15 nm≧h>10 nm is 3,360,000/mm$^2$; and a density of fine projections defined by an expression 10 nm≧h>5 nm is 11,850,000/mm$^2$, as shown in FIG. 8, was prepared and, then the film thickness of the thin metal film was only selected to be 32 nm and other conditions to be similar to Example 1, to have a sample for Comparative Example 3.

The results of measurements with respect to diameters and densities of the projections of the finished magnetic tapes are listed in FIG. 9, and the results of assessment of the measurements are also listed in FIG. 1.

Comparative Example 4

A sample for Comparative Example 4 was prepared in such a manner that only the film thickness of the thin metal film of Example 3 would be selected to be 77 nm and other conditions would be similar to Comparative Example 3. The results of measurements with respect to diameters and densities of the projections of the finished magnetic tapes are listed in FIG. 10, and the results of assessment of the measurements are also listed in FIG. 1.

Comparative Example 5

A polyethylene naphthalate film of the non-magnetic base having fine projections h formed on its surface, in which:

a content of fillers having a filler diameter defined by an expression, 50 nm≧φ≧10 nm, is 100%;

a density of fine projections defined by an expression h>20 nm is 127,000/mm$^2$;

a density of fine projections defined by an expression 20 nm≧h>15 nm is 426,000/mm$^2$;

a density of fine projections defined by an expression 15 nm≧h>10 nm is 13,680,000/mm$^2$; and a density of fine projections defined by an expression 10 nm≧h>5 nm is 25,100,000/mm$^2$, as shown in FIG. 11, was prepared and, then the film thickness of the thin metal film was only selected to be 34 nm and other conditions to be similar to Example 1, to have a sample for Comparative Example 5.

The results of measurements with respect to diameters and densities of the projections of the finished magnetic tapes are listed in FIG. 12, and the results of assessment of the measurements are also listed in FIG. 1.

Comparative Example 6

A sample for Comparative Example 6 was prepared in order that only the film thickness of the thin metal film of Comparative Example 5 would be selected to be 79 nm and other conditions would be similar to Comparative Example 5. The results of measurements with respect to diameters and densities of the projections of the finished magnetic tapes are listed in FIG. 13, and the results of assessment of the measurements are also listed in FIG. 1.

Comparative Example 7

A polyethylene naphthalate film of the non-magnetic base having fine projections h formed on its surface, in which:

a content of fillers having a filler diameter defined by an expression, 50 nm≧φ≧10 nm, is 58.2%;

a density of fine projections defined by an expression h>20 nm is 156,000/mm$^2$;

a density of fine projections defined by an expression 20 nm≧h>15 nm is 382,000/mm$^2$;

a density of fine projections defined by an expression 15 nm≧h>10 nm is 11,980,000/mm$^2$; and a density of fine projections defined by an expression 10 nm≧h>5 nm is 15,640,000/mm$^2$, as shown in FIG. 14, was prepared and, then, the film thickness of the thin metal film was only selected to be 34 nm and other conditions to be similar to Example 1, to have a sample for Comparative Example 7.

The results of measurements with respect to diameters and densities of the projections of the finished magnetic tapes are listed in FIG. 15, and the results of assessment of the measurements are also listed in FIG. 1.

For the $C/N_{media}$ measurement as in Table 1, a modified 8 mm video deck was prepared. After recording an information signal on each sample of magnetic tapes through a recording wavelength of 0.3 μm, a reproducing output and a tape noise were measured by means of a MR head so as to calculate a $C/N_{media}$.

In Table 1, a value of $C/N_{media}$ was expressed in a relative value based on a reference value which was a value on the magnetic tape sample as in Example 1.

The value of $C/N_{media}$ is preferably as high as possible for a magnetic tape characteristic. Compared with the reference value, when a fall from the reference value was within 1.6 dB, it was determined to be sufficient to manufacture. For a fall more than 1.6 dB, it was determined not to be sufficient to manufacture.

As for shuttling durability, a tape sample wound in an 8 mm video-cassette was tested in a modified 8 mm video deck having a MR head mounted therein. After 50-time 60-minute repeated runs for each tape sample, a tape sample which resulted in signal degradation not greater than 3 dB was determined to be "◯", whereas a tape sample which resulted in signal degradation more than 3 dB was determined to be "x".

The corrosion resistance was measured by determining it in an $SO_2$ gas atmosphere. Each sample was left to stand for 13 hours in the atmosphere having a temperature of 30° C., a relative humidity of 80%, and an $SO_2$ gas concentration of 0.5 ppm, magnetization intensities before and after the corrosion test were measured to determine the corrosion resistance. In the determination, a demagnetization ratio was defined by the following equation:

Demagnetization Ratio (%)={1−(Magnetization Intensity Before Corrosion Test)/(Magnetization Intensity After Corrosion Test)}×100

When no corrosion occurred in a sample at all, the demagnetization ratio is 0%, whereas when the entire sample corrodes, the demagnetization ratio is 100%, thereby determining the corrosion resistance by values. The magnetization intensity was measured by means of a vibrating sample magnetometer.

As to abrasion loss of the MR head, a tape sample wound in an 8 mm video-cassette was tested in a modified 8 mm video deck having a MR head mounted therein. The abrasion loss was calculated based on electric resistance of the MR head after a 100-hour run in the video deck. Samples of Comparative Examples 1, 3 and 4 were all worn away before they ran 100 hours.

Assuming that a height of the fine projections on the surface of the non-magnetic base is h' and a diameter of the fine projections at a half-height h'/2 is $\phi'_{h'/2}$, 99% of the fine projections having a height not less than 10 nm satisfy a relationship expressed by 50 nm≧$\phi'_{h'/2}$≧10 nm, and a relationship between the height h' of the fine projections of the non-magnetic base and a density P' of the fine projections having the following relationships:

for h>20 nm, P' is 100,000/mm$^2$ or less;

for 20 nm≧h'>15 nm, P' is 100,000/mm$^2$ or more and 300,000/mm$^2$ or less;

for 15 nm≧h'>10 nm, P' is 2,000,000/mm$^2$ or more and 15,000,000/mm$^2$ or less; and for 10 nm≧h>5 nm, P' is 30,000,000/mm$^2$ or less.

Co is evaporated and deposited on the non-magnetic base so as to form a magnetic layer comprising a magnetic metal thin-film then to form a diamond-like carbon protective layer on the magnetic layer by means of a plasma CVD process. Subsequently, a lubricant containing one or more perfluoro polyethers is applied to the magnetic surface side of a sample.

Assuming that a height of the fine projections of the sample is h and a diameter of the fine projections at a half-height h/2 is $\phi_{h/2}$, 99% of the fine projections having a height not less than 10 nm satisfy an expression 100 nm≧$\phi_{h/2}$≧40 nm, and relationships between the height h of the fine projections and a density P are as follows:

for h>25 nm, P is not greater than 250,000/mm$^2$;

for 25 nm≧h>20 nm, P is between 300,000/mm$^2$ and 1,250,000/mm$^2$ (inclusive);

for 20 nm≧h>15 nm, P is between 1,000,000/mm$^2$ and 3,750,000/mm$^2$ (inclusive);

for 15 nm≧h>10 nm, P is between 8,000,000/mm$^2$ and 25,000,000/mm$^2$ (inclusive); and for 10 nm≧h>5 nm, P is not greater than 50,000,000/mm$^2$.

Thus, the resulting C/N$_{media}$, shuttling durability, corrosion resistance, and abrasion resistance of the MR head allow the magnetic recording medium to be manufactured.

Although the invention has been described in its preferred form with a certain degree of particularity, obviously many changes and variations are possible therein. It is therefore to be understood that the present invention may be practiced otherwise than as specifically described herein without departing from the scope and the sprit thereof.

What is claimed is:

1. A magnetic recording medium having a magnetic layer formed over a main surface of a non-magnetic base by means of a vacuum thin-film forming process and being applicable to a reproducing system which uses a magneto-resistance effect magnetic head (MR head) or a giant magneto-resistance effect magnetic head (GMR head), said magnetic recording medium comprising fine projections on an outermost surface of the magnetic layer side of said magnetic recording medium, wherein, assuming a height of the fine projections to be h and a diameter of the fine projections at a half-height h/2 to be $\phi_{h/2}$, 99% of the fine projections having a height not less than 10 nm satisfy an expression 100 nm≧$\phi_{h/2}$≦40 nm;

wherein a height h and a density P of said fine projections of said magnetic recording medium are defined as follows:

for h>25 nm, P is 250,000/mm$^2$ or less;

for 25 nm≧h>20 nm, P is 300,000/mm$^2$ or more and 1,250,000/mm$^2$ or less;

for 20 nm≧h>15 nm, P is 1,000,000/mm$^2$ or more and 3,750,000/mm$^2$ or less;

for 15 nm≧h>10 nm, P is 8,000,000/mm$^2$ or more and 25,000,000/mm$^2$ or less; and for 10 nm≧h>5 nm, P is 50,000,000/mm$^2$ or less.

2. The magnetic recording medium according to claim 1, wherein, assuming a height of the fine projections on said surface of said non-magnetic base to be h' and a diameter of the fine projections at a half-height h'/2 to be $\phi_{h/2}$, 99% of the fine projections having a height not less than 10 nm satisfy an expression 50 nm≧$\phi'_{h/2}$≧10 nm.

3. A magnetic recording medium having a magnetic layer formed over a main surface of a non-magnetic base by means of a vacuum thin-film forming process and being applicable to a reproducing system which uses a magneto-resistance effect magnetic head (MR head) or a giant magneto-resistance effect magnetic head (GMR head), said magnetic recording medium comprising fine projections on an outermost surface of the magnetic layer side of said magnetic recording medium, wherein, assuming a height of the fine projections to be h and a diameter of the fine projections at a half-height h/2 to be $\phi_{h/2}$, 99% of the fine projections having a height not less than 10 nm satisfy an expression 100 nm≧$\phi_{h/2}$≧40 nm;

wherein a height h' of said fine projections of said non-magnetic base and a density P' of said fine projections are defined by as follows:

for h'>20 nm, P' is not greater than 100,000/mm$^2$;

for 20 nm≧h'>15 nm, the density P' is between 100,000/mm$^2$ or more and 300,000/mm$^2$ or less;

for 15 nm≧h'>10 nm, P' is 2,000,000/mm$^2$ or more and 15,000,000/mm$^2$ or less; and for 10 nm≧h'>5 nm, P' is 30,000,000/mm$^2$ or less, and said magnetic layer having a thickness of 30 nm or more and 80 nm or less is formed over said non-magnetic base.

4. A magnetic recording medium having a magnetic layer formed over a main surface of a non-magnetic base by means of a vacuum thin-film forming process and being applicable to a reproducing system which uses a magneto-resistance effect magnetic head (MR head) or a giant magneto-resistance effect magnetic head (GMR head), said magnetic recording medium comprising fine projections on an outermost surface of the magnetic layer side of said magnetic recording medium, wherein, assuming a height of the fine projections to be h and a diameter of the fine projections at a half-height h/2 to be $\phi_{h/2}$, 99% of the fine projections having a height not less than 10 nm satisfy the expression 100 nm≧$\phi_{h/2}$≧400 nm;

wherein said non-magnetic base has a thickness of 3.8 $\mu$m or more and 5.3 $\mu$m or less; an arithmetic mean roughness Ra of said magnetic layer side is 1.0 nm to 2.3 nm; a maximum roughness depth Ry is 20 nm to 50 nm; and a mean roughness depth Rz is 15 nm to 35 nm.

5. A magnetic recording medium having a magnetic layer formed over a main surface of a non-magnetic base by means of a vacuum thin-film forming process and being applicable to a reproducing system which uses a magneto-resistance effect magnetic head (MR head) or a giant magneto-resistance effect magnetic head (GMR head), said magnetic recording medium comprising fine projections on an outermost surface of the magnetic layer side of said magnetic recording medium, wherein, assuming a height of the fine projections to be h and a diameter of the fine projections at a half-height h/2 to be $\phi_{h/2}$, 99% of the fine projections having a height not less than 10 nm satisfy the expression 100 nm≧$\phi_{h/2}$≧40 nm;

wherein a coercive force of said magnetic recording medium is 80 KA/m or more and 180 KA/m or less; and a product Mr·t of remanent magnetization Mr and the film thickness t is 10 mA or more and 30 mA or less.

* * * * *